United States Patent [19]

Sallier

[11] 3,893,712
[45] July 8, 1975

[54] HITCH FOR FIFTH WHEEL TRAVEL TRAILER

[76] Inventor: Eugene A. Sallier, 2211 W. Oak St., Denton, Tex. 76201

[22] Filed: May 28, 1974

[21] Appl. No.: 473,564

[52] U.S. Cl. .................................................. 280/440
[51] Int. Cl. ............................................. B62d 53/08
[58] Field of Search .......... 280/402, 432, 438, 439, 280/440, 433

[56] References Cited
UNITED STATES PATENTS

| | | | |
|---|---|---|---|
| 2,541,209 | 2/1951 | Cox | 280/402 |
| 2,923,560 | 2/1960 | Anderson | 280/440 X |
| 3,392,992 | 7/1968 | Baker et al. | 280/423 R |
| 3,774,942 | 11/1973 | Holland | 280/440 |

Primary Examiner—Leo Friaglia
Assistant Examiner—R. Schrecengost
Attorney, Agent, or Firm—Richards, Harris & Medlock

[57] ABSTRACT

In a hitch for a fifth wheel travel trailer, a box frame depends from the front end of the frame of the travel trailer. A tube extends through the box frame and receives a rod which supports a saddle for pivotal movement about a longitudinal axis. A king pin depends from the saddle and is received in latching apparatus mounted on the bed of a pickup truck. The king pin and the latching apparatus permit relative pivotal movement between the pickup truck and the travel trailer about a vertical axis. The latching apparatus is mounted on a plate which is in turn supported for pivotal movement about a transverse axis.

6 Claims, 3 Drawing Figures

PATENTED JUL 8 1975　　　　　　　　　　　　　3,893,712

HITCH FOR FIFTH WHEEL TRAVEL TRAILER

BACKGROUND AND SUMMARY OF THE INVENTION

This invention relates to a hitch for fifth wheel travel trailers, and more particularly to a hitch for connecting a fifth wheel travel trailer to a pickup truck which accommodates relative pivotal movement between the vehicles about three mutually perpendicular axes.

At the present time, there is considerable interest in recreational vehicles of all types, such as motor homes, pickup campers, travel trailers, and the like. One type of travel trailer which has gained considerable acceptance relatively recently is the fifth wheel travel trailer. Such a device is adapted for connection to the bed of a pickup truck at a point located forwardly of the rear wheels, as opposed to being connected to the bumper of the towing vehicle as is the case with conventional travel trailers. This is advantageous in distributing the load of the travel trailer more uniformly with respect to the wheels of the pickup truck, thereby substantially reducing the tendency of the front wheels of the pickup truck to lift upwardly during towing. For this and other reasons, the handling characteristics of a pickup truck/fifth wheel travel trailer rig are considerably improved over those of a pickup truck/conventional travel trailer rig.

At the present time, most fifth wheel travel trailers are provided with a hitch comprising a box frame depending from the front end of the frame of the travel trailer and a king pin secured to the bottom of the box frame. The king pin is received in latching apparatus which is supported on the bed of the pickup truck for pivotal movement about a transverse axis. This type of hitch has been found to be unsatisfactory because it does not accommodate relative pivotal movement between the pickup truck and the travel trailer about a longitudinal axis. Therefore, during the use of the pickup truck/fifth wheel travel trailer rig, forces are transmitted through the hitch to the frame of the travel trailer which tends to bend, loosen, or otherwise damage the component parts of the travel trailer. Thus, a need exits for a hitch for fifth wheel travel trailers which accommodates relative pivotal movement between a pickup truck and a travel trailer about a longitudinal axis.

The present invention comprises a hitch for fifth wheel travel trailers which overcomes the foregoing and other problems long since associated with the prior art. In accordance with the broader aspects of the invention, a fifth wheel travel trailer is connected to a pickup truck by means of latching apparatus mounted on the bed of the pickup truck and a king pin which depends from a saddle. The saddle is in turn supported on a box frame depending from the frame of the travel trailer such that it is adapted for relative pivotal movement about a longitudinal axis. This in turn permits relative pivotal movement between the pickup truck and the travel trailer about the longitudinal axis.

In accordance with more specific aspects of the invention, a sleeve extends through the box frame and receives a rod which in turn supports the saddle and the king pin. Apparatus is provided for directing lubricant into the sleeve and thereby assuring that the rod is free to pivot within the sleeve. Resilient bushing members are mounted on the saddle and engage the underside of the box frame. The resilient bushing members regulate the operation of the hitch by limiting relative pivotal movement between the pickup truck and the travel trailer about the longitudinal axis and thereby providing stability, while at the same time allowing sufficient pivotal movement about the longitudinal axis to prevent damage to the travel trailer.

DESCRIPTION OF THE DRAWINGS

A more complete understanding of the invention may be had by reference to the following detailed description when taken in conjunction with the accompanying drawings, wherein.

DETAILED DESCRIPTION

Figure 1:
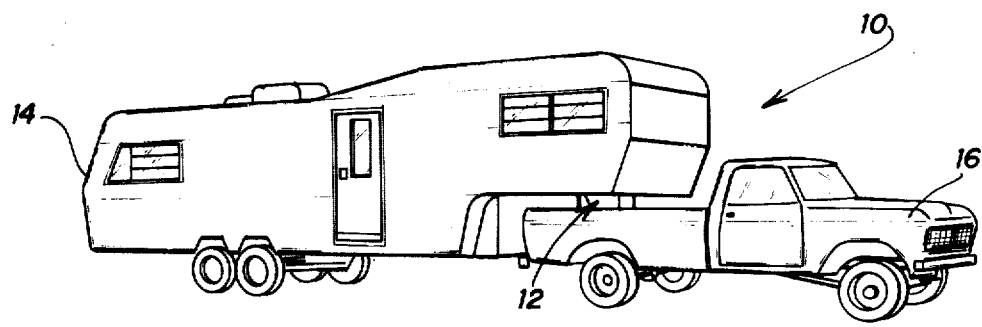
FIG. 1 is a side view of a pickup truck/fifth wheel travel trailer utilizing the hitch of the present invention.

Referring to the Drawings, and particularly to FIG. 1 thereof, there is shown a pickup truck/fifth wheel travel trailer rig 10 utilizing a hitch 12 incorporating the present invention. In the rig 10, the hitch 12 is utilized to connect an otherwise conventional fifth wheel travel trailer 14 to an otherwise conventional pickup truck 16. It will be noted that in accordance with typical fifth wheel travel trailer practice, the hitch 12 is utilized to connect the travel trailer 14 to the truck 16 at a point located forwardly of the rear wheels of the truck, whereby the load imposed on the truck by the trailer is more evenly distributed among the four wheels of the truck.

Figure 2:
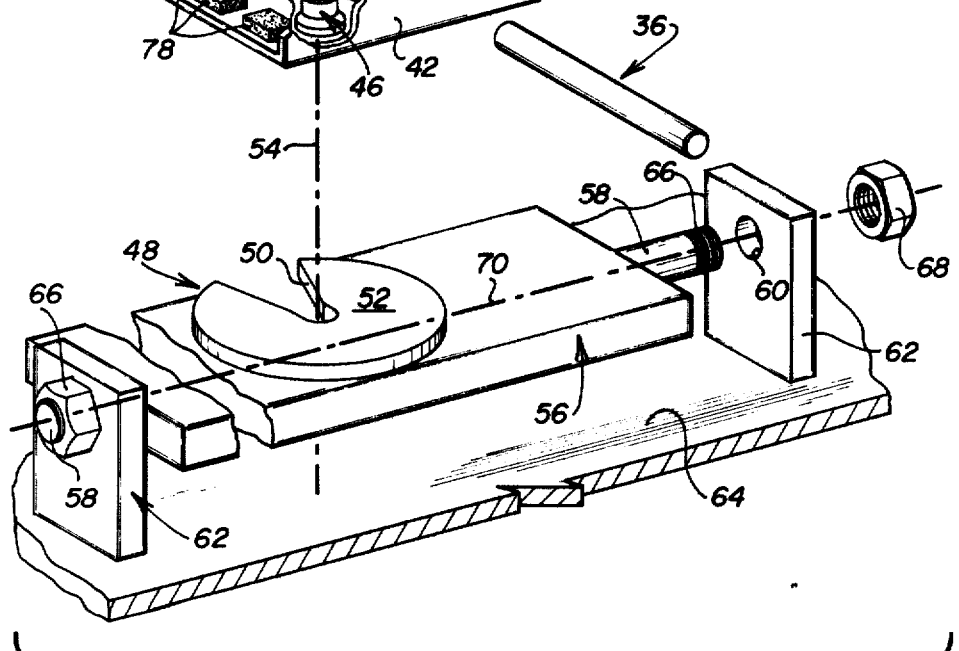
FIG. 2 is an exploded view of a hitch for fifth wheel travel trailers incorporating the invention.

The hitch 12 is illustrated in detail in FIG. 2. A box frame 20 is secured to the underside of the frame of the travel trailer 14 at the forward end thereof. The box frame 20 is rectangular in configuration and comprises four side walls 22 each formed from steel plate. A bottom wall 24 also formed from steel plate is secured to the lower ends of the side walls 22, as by welding.

A sleeve 26 is secured in the box frame 20 and defines a longitudinal axis 28. The sleeve 26 extends through apertures 30 formed in the front and rear side walls 22, and is secured therein by suitable means, for example, by welding. A grease fitting 32 is mounted in the rear side wall 22 of the box frame 20 and is connected to the midportion of the sleeve 26 by a tube 34. By this means a suitable lubricant may be directed into the sleeve 26.

A rod 36 is received in the sleeve 26 and serves to support a saddle 38 for pivotal movement about the longitudinal axis 28. The saddle 38 is formed from steel plates and comprises a bottom wall 40 and opposed side walls 42. The rod 36 extends through apertures 44 formed in the side walls 42 and is secured therein by suitable means, such as by welding. Thus, the saddle 38 does not pivot on the rod 36, but instead the rod 36 pivots within the sleeve 26. Such pivotable movement is facilitated by means of lubricant directed into the sleeve 26 through the grease fitting 32 and the tube 34.

A king pin 46 is secured to the underside of the bottom wall 40 of the saddle 38, such as by welding. The king pin 46 is received in a conventional latching apparatus 48 to connect the travel trailer 14 to the pickup truck 16. The latching apparatus 48 includes a generally V-shaped slot 50 which facilitates the positioning of the king pin 46 therein, and a conventional locking mechanism (not shown) which functions to securely retain the king pin 46 in engagement with the latching apparatus 48.

The latching apparatus 48 further includes a bearing surface 52 which engages the underside of the bottom wall 40 of the saddle 38 when the king pin 46 is secured in the latching apparatus 48. The bearing surface 52, the underside of the bottom wall 40, the king pin 46, and the latching apparatus 48 are all designed to facilitate relative pivotal movement between the pickup truck 16 and the travel trailer 14 about a vertical axis 54. It will be understood that such relative pivotal movement between the pickup truck 16 and the trailer 14 is necessary in order to effect turning on the rig 10.

The latching apparatus 48 is mounted on a plate 56 having bearing members 58 extending from each end thereof. The bearing members 58 are received in apertures 60 formed in brackets 62 which extend upwardly from the bed 64 of the pickup truck 16. The bearing members 58 have threaded end portions 66 which receive nuts 68 to secure the plate 56 to the bracket 62. It will thus be understood that the latching apparatus 48 and the plate 56 are supported by the bearing members 58 for pivotal movement about a transverse axis 70.

Figure 3:
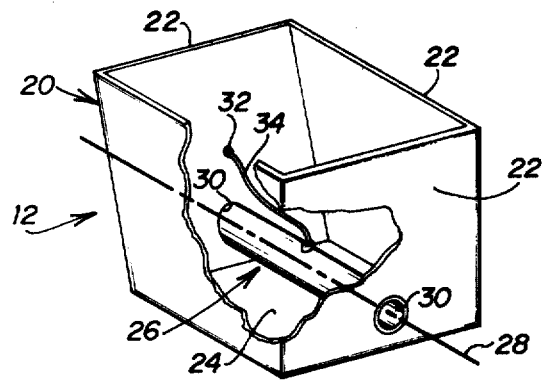
FIG. 3 is a side view further illustrating the hitch of FIG. 2.
Figure 3:
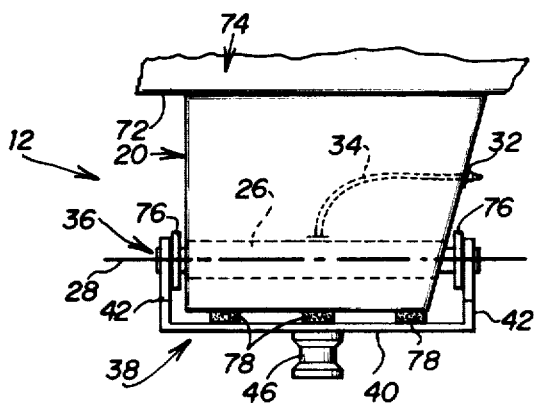

Referring now to FIG. 3, the mounting of the box frame 20 of the hitch 12 on the underside 72 of the frame 74 of the fifth wheel travel trailer 14 is shown. The box frame 20 may be secured to the frame 74 of the trailer 14 by suitable means, for example, by means of welding. A pair of washers 76 are mounted on the rod 36 and are positioned between the box frame 20 and the saddle 38. The washers 78 serve to maintain proper spacing between the box frame 20 and the saddle 38, and also serve to prevent direct frictional engagement therebetween.

A plurality of resilient bushings 78 are mounted on the bottom wall 40 of the saddle 38 and engage the underside of the bottom wall 24 of the box frame 20. The bushings 78 are formed from a material such as hard rubber and serve to regulate pivotal movement between the pickup truck 16 and the fifth wheel travel trailer 14 about the longitudinal axis 28. Thus, if the bushings 78 were not utilized, the rig 10 might tend to lack stability, such as during high winds, when passing other vehicles, when on rough terrain, etc. It has been found that the resilient bushings 78 act as energy absorbers to prevent any such instability while nevertheless permitting sufficient relative pivotal movement between the pickup truck 16 and the fifth wheel travel trailer 14 about the longitudinal axis 28 to prevent undue stress from being applied to the travel trailer through the hitch.

The present invention further comprises a particular method of fabricating the hitch 12. Assuming that a fifth wheel travel trailer is equipped with a conventional hitch, the lower portion of the box frame of the hitch is removed. The apertures 30 are then formed in the front and rear side walls 22 of the box frame 20. The sleeve 26 is then positioned in the apertures 30 and is secured therein by suitable means, such as welding. The grease fitting 32 and the tube 34 are then installed.

The king pin 46 is removed from the disconnected lower portion of the prior box frame. The bottom wall 24 of the box frame 20 may be fabricated from the disconnected lower portion of the prior box frame, if desired. The bottom wall 24 may be secured to the side walls 22 by means of welding, or other suitable means.

The king pin 46 is secured to the underside of the bottom wall 40 of the saddle 38 by suitable means, such as welding. The component parts of the hitch 12 are then assembled in the manner described hereinbefore. At this point the hitch 12 is ready for use in connecting a fifth wheel travel trailer to a pickup truck.

From the foregoing, it will be understood that the present invention incorporates numerous advantages over the prior art. Perhaps the most important advantage deriving from the use of the invention involves the fact that by means thereof there is provided a hitch for connecting a fifth wheel travel trailer to a pickup truck which permits sufficient relative pivotal movement between the vehicles to prevent the application of excessive loads to the frame of the travel trailer, thereby preventing damage to the travel trailer. At the same time relative pivotal movement between the vehicles about the longitudinal axis is regulated so as to prevent instability in the pickup truck/travel trailer rig. Other advantages deriving from the use of the invention will readily suggest themselves to those skilled in the art.

Although particular embodiments of the invention have been illustrated in the drawings and described hereinbefore, it will be understood that the invention is not limited to the embodiments disclosed, but is capable of numerous rearrangements, modifications and substitutions of parts and elements without departing from the spirit of the invention.

What is claimed is:

1. A hitch for connecting a fifth wheel travel trailer to a pickup truck which comprises:

a box frame depending from the frame of the travel trailer at the front end thereof and comprising side walls and a bottom wall;

a rod;

means supporting the rod on the box frame for pivotal movement about a longitudinal axis and comprising a sleeve mounted on the box frame and defining said longitudinal axis and having the rod pivotally received therein;

a saddle mounted on the rod for pivotal movement about said longitudinal axis and comprising a bottom wall and side walls extending adjacent to and positioned outside of the side walls of the box frame;

the rod being secured to the side walls of the saddle so that the saddle pivots with the rod about the longitudinal axis;

a king pin depending from the bottom wall of the saddle for engagement with latching apparatus mounted on the bed of the pickup truck to connect the travel trailer to the pickup truck; and a plurality of resilient members mounted on the bottom wall of the saddle in engagement with the bottom wall of the box frame for regulating pivotal movement of the saddle about said longitudinal axis and thereby stabilizing the pivotal movement of the travel trailer relative to the pickup truck.

2. The hitch for connecting a travel trailer to a pickup truck according to claim 1 further including means for directing lubricant into the sleeve and thereby lubricating the pivotal movement of the rod therein.

3. In a pickup truck/fifth wheel travel trailer rig of the type including a pickup truck having a bed, a latching apparatus, structure supporting the latching apparatus on the bed of the pickup truck for pivotal movement about a transverse axis, and a fifth wheel travel trailer having a frame, the improvement comprising:
- a box frame secured to and depending from the frame of the fifth wheel travel trailer at the front end thereof and comprising side walls and a bottom wall;
- a saddle comprising a bottom wall and side walls extending adjacent to and positioned outside of the side walls of the box frame;
- means supporting the saddle on the box frame for pivotal movement about a longitudinal axis and comprising:
    - sleeve means mounted on the box frame and defining said longitudinal axis;
    - a rod extending through the sleeve means for pivotal movement therein; and
    - means securing the side walls of the saddle to the rod so that the saddle pivots with the rod about said longitudinal axis;
- a plurality of resilient bushing members mounted on the bottom wall of the saddle and engaging the bottom wall of the box frame for regulating pivotal movement of the saddle about said longitudinal axis; and
- a king pin secured to and depending from the bottom wall of the saddle for cooperation with the latching apparatus on the pickup truck to connect the fifth wheel travel trailer to the pickup truck and for accommodating relative pivotal movement between the fifth wheel travel trailer and the pickup truck about a vertical axis.

4. The improvement according to claim 3 further including means for directing lubricant into the sleeve means and thereby facilitating pivotal movement of the rod therein.

5. In combination:
- a pickup truck having a bed;
- a king pin latching apparatus;
- means supporting the king pin latching apparatus on the bed of the pickup truck for pivotal movement about a transverse axis;
- a fifth wheel travel trailer having a frame;
- a box frame depending from the frame of the fifth wheel travel trailer at the front end thereof and comprising side walls and a bottom wall;
- a sleeve disposed between the side walls of the box frame and defining said longitudinal axis;
- a saddle comprising a bottom wall and side walls extending adjacent to and positioned outside of the side walls of the box frame;
- a rod pivotally supported in the sleeve and secured to the side walls of the saddle so that the saddle pivots with the rod relative to the box frame about a longitudinal axis;
- resilient means disposed between the saddle and the box frame for regulating pivotal movement of the saddle about the longitudinal axis;
- said resilient means comprising a plurality of resilient bushing members mounted on the bottom wall of the saddle and engaging the bottom wall of the box frame; and
- a king pin depending from the bottom wall of the saddle for engagement with the king pin latching apparatus to connect the fifth wheel travel trailer to the pickup truck and for accommodating relative pivotal movement between the fifth wheel travel trailer and the pickup truck about a vertical axis.

6. The combination according to claim 5 further including means for directing lubricant into the space between the sleeve and the rod.

* * * * *